March 31, 1964  J. T. GONDEK  3,126,768
WORK POSITIONING TABLES
Filed July 1, 1960  2 Sheets-Sheet 1

INVENTOR,
JOHN T. GONDEK.
BY *Robert M. Dunning*
ATTORNEY

March 31, 1964     J. T. GONDEK     3,126,768
WORK POSITIONING TABLES
Filed July 1, 1960     2 Sheets-Sheet 2
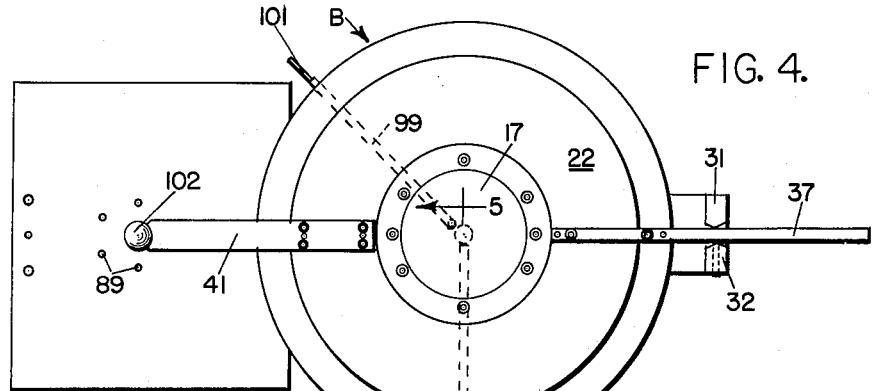
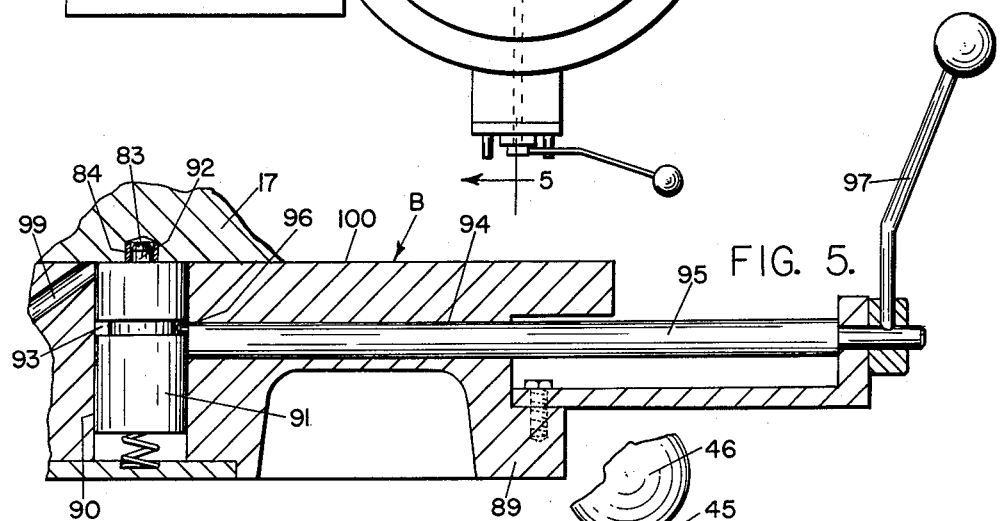
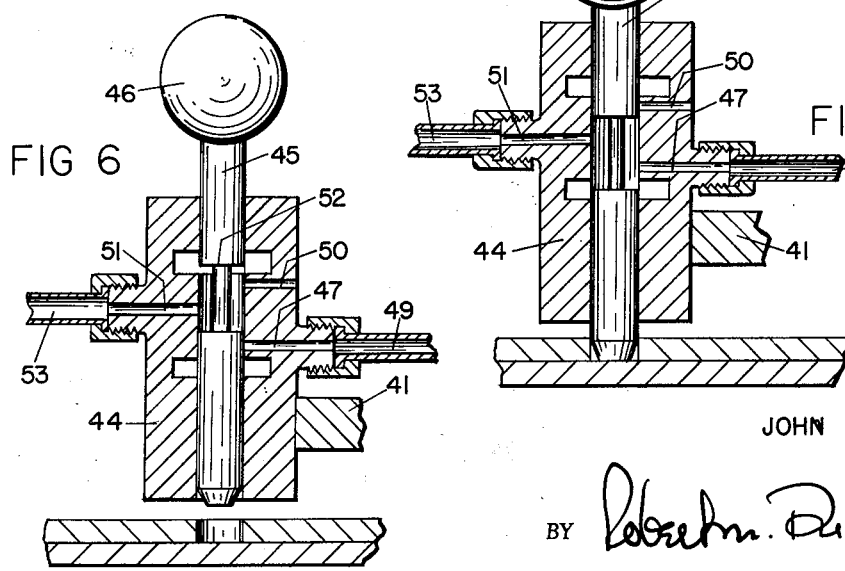
INVENTOR;
JOHN T. GONDEK.
BY *Robert M. Dunning*
ATTORNEY United States Patent Office 3,126,768
Patented Mar. 31, 1964

3,126,768
WORK POSITIONING TABLES
John T. Gondek, 2206 Roosevelt St. NE.,
Minneapolis, Minn.
Filed July 1, 1960, Ser. No. 40,382
15 Claims. (Cl. 77—64)

This invention relates to an improvement in work positioning tables and deals particularly with a table of the type used in conjunction with a drill press to insure the proper location of holes being drilled in a series of similar work pieces.

Work tables of the type in question have been commonly used where a series of work pieces are to be drilled with a series of identical holes. These work tables are usually provided with disposable plates upon which is provided some means of holding the work pieces in a predetermined location on the table. Means are provided for moving the disposable plate to any of a series of locations beneath the spindle of the drill press. By accurately moving the disposable plate from one position to another, holes may be drilled in the work piece at the necessary points. Thus the table obviates the necessity of laying out each of the work pieces separately, and attempting to drill the holes at the proper location.

In order that the disposable plates may be moved, the movable portion of the tables have sometimes been mounted upon the fixed portions thereof by hardened ball bearings. While such an arrangement simplifies the movement of the movable portion of the table, it also makes it difficult to maintain the movable portion of the table in fixed relation to the fixed portion. Furthermore, due to the fact that the disposable plate or hole location plate is sometimes completely hidden from view, it is difficult for the operator to move the table from one position to the other without knowing the location of the holes to be drilled. As a result, difficulty is sometimes experienced in using the tables.

An object of the present invention resides in the provision of the work positioning table which eliminates most of the difficulties previously experienced with devices of this type. Means are provided to simplify the task of moving the movable portion of the table relative to the fixed portion thereof with comparative ease while permitting the movable portion of the table to rest upon a fixed solid surface during the drilling operation.

A feature of the present invention resides in the provision of a work positioning table including a fixed bottom portion and a movable upper portion which may be moved from one position to the other to properly locate the work pieces relative to the drill spindle. Lubricating fluid is injected between the movable portion of the table and the fixed portion thereof during the moving operation so that the movable portion rides on a film of lubricant from one position to the other. During the drilling operation, suction is provided between the movable portion and the fixed portion to firmly hold the movable portion in a set position during the drilling operation.

A further feature of the present invention resides in the provision of a means of roughly locating the movable portion of the table in proper position. A locating pin is provided in the fixed portion of the table which is engageable into any of a series of sockets in the under surface of the movable table, these sockets being directly opposed to the holes to be drilled in the work piece, or in alignment with the axis of the drill press spindle. A fulcrum bar is mounted to extend radially from the movable table portion between a pair of fulcrum points. An operating arm extends from the opposite side thereof and includes a manually operable pin which is vertically slidable in a bearing on the arm and which is engageable with any of a series of locating openings on a disposable plate mounted to one side of the table. By lifting the pin from one hole and moving the operating arm, the pin may be inserted in another of the locating holes at which time the work piece is located in approximately the desired position. The positioning pin may then be projected upwardly into a corresponding socket in the bottom of the work table to hold the movable portion of the table in an exact position during the drilling operation.

A further feature of the present invention resides in the provision of a novel means of projecting and retracting the positioning pin for engagement into its socket. This operation may either be a manual operation, or may be a pneumatic operation in which the positioning pin may be retracted or projected simultaneously with the application of fluid or suction beneath the movable portion of the table.

These and other objects and novel features of the present invention will be more clearly and fully set forth in the following specification and claims.

In the drawings forming a part of the specification:

FIGURE 4 is a top plan view of the modified form of table.

FIGURE 5 is a sectional view through the table, the position of the section being indicated by the line 5—5 of FIGURE 4.

FIGURE 6 is a sectional view through a portion of the structure shown in FIGURE 2, the section being shown in enlarged scale.

FIGURE 7 is a view similar to FIGURE 6 showing the parts in the different relative positions.

Figure 1:
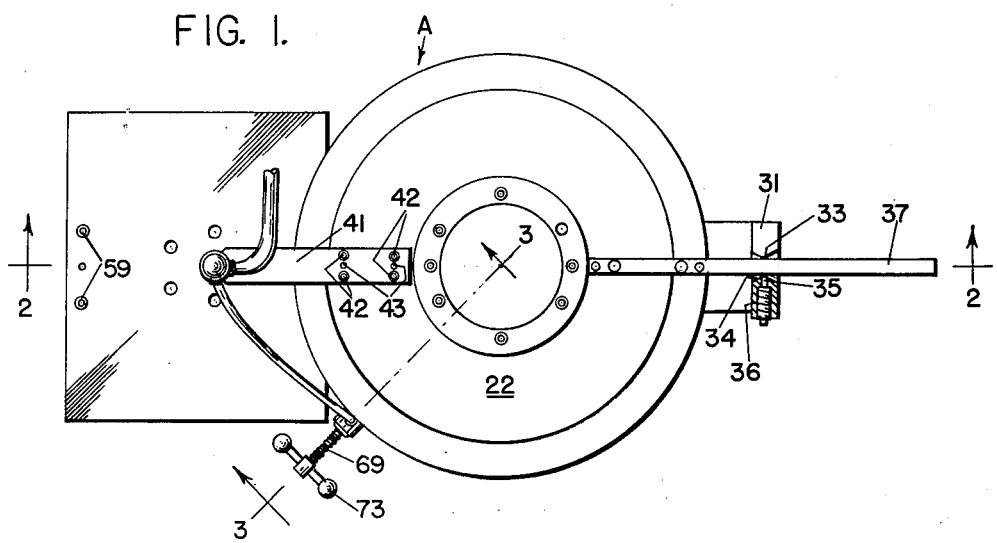
FIGURE 1 is a top plan view of the work positioning table showing the general arrangement of parts therein.
Figure 2:
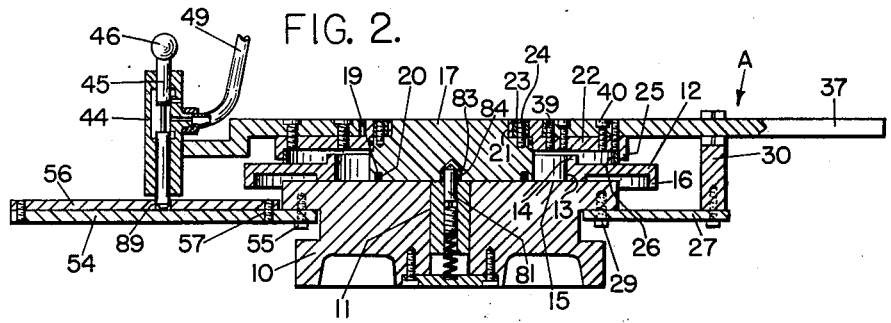
FIGURE 2 is a sectional view through the apparatus, the position of the section being indicated by the line 2—2 of FIGURE 1.

As indicated in the drawings, the work positioning table A being illustrated in FIGURES 1, 2, 3, 6 and 7 of the drawings includes a table base designed to rest upon the table of a drill press or the like, the base being indicated in general by the numeral 10. The base is shown as being circular in plan and is provided with a central axial aperture 11 therein. A plate 12 of ring shaped form is provided with an axial aperture 13 which is encircled by a flange 14 extending upwardly and downwardly from the surface of the plate. The bottom of the flange 14 rides upon the upper flat surface 15 of the base 10. A downwardly extending peripheral flange 16 is provided on the plate 12 to limit movement of the plate in any direction. The flange 16 is so located that in any position of the plate, the flange 14 will bear upon the flat upper surface 15 of the base.

A disposable fixture plate 17 of circular outline is slidably supported upon the upper surface 15 of the base 10. This plate 17 is provided with a ring shaped groove 19 in its under surface adjacent the outer periphery of the plate. This groove contains a sealing ring 20 which forms a seal between the plate and the surface 15. The plate 17 is peripherally grooved at 21 along its upper surface. A second plate 22 is provided with an offset ring shaped flange 23 which fits into the groove 21. Dowels or other fastening means 24 extend through the flange 23 and into suitable openings in the fixture plate for holding the plate 22 connected to the fixture plate 17.

A downwardly extending peripheral flange 25 is provided on the plate 22 which terminates in spaced relation above the upper surface of the plate 12. A scraper blade 26 is mounted inwardly of the flange 25 and rides upon the upper surface of the plate 12. The flange 25 and its scraper blade 26 are engageable with the upwardly extending portion of the flange 14 to limit movement of the plate 22 relative to the plate 12. The proportions are such that the periphery of the plate 22 cannot extend beyond the periphery of the plate 12 in any relative position of the two parts.

A bracket 27 is secured to the base 10 beneath the surface 15 by bolts or similar means 29. An upwardly extending bracket member 30 is supported at the outer end of the arm 27 and is provided with a bifurcated upper end including spaced lugs 31 and 32 having wedge shaped inner ends 33 and 34 respectively which form fulcrums. One of the fulcrum points 34 includes a plunger 35 which fits in a transverse recess 36 and which is urged against a lever arm 37 engaged between the fulcrums 33 and 34. The lever arm 37 extends radially outwardly from the plate 22 and is held in position by dowels 39, and bolts 40.

An operating arm 41 is bolted to the plate 22 by bolts 42 and is properly positioned by dowels 43. A vertically extending cylinder 44 is secured to the outer end of the arm 41. The cylinder 44 supports a vertically slidable valve plunger 45 having a manually engageable ball shaped upper end 46. The construction of this cylinder and plunger is best illustrated in FIGURES 6 and 7 of the drawings.

An inlet port 47 is connected to a conduit 49 leading to a source of fluid pressure such as compressed air. A second port 50 in axially spaced relation to the port 47 leads to atmosphere or forms a vent opening. A third port 51 is located intermediate the ports 47 and 50. The valve plunger 45 is provided with a reduced diameter portion 52 which may form a connection either between the port 51 and the vent 50, or the port 51 and the port 47. When the valve plunger 45 is in elevated position, as indicated in FIGURE 6 of the drawings, the port 51 and the conduit 53 connected thereto are subjected to atmospheric pressure. When the plunger 45 is lowered, as indicated in FIGURE 7 of the drawings, the vent opening 50 is closed by the plunger and the port 47 is connected to the port 51 and the conduit 53.

A supporting plate 54 is bolted or otherwise secured at 55 to the base 10 to extend on a horizontal plane beneath the surface 15 of the base 10. A disposable hole locating plate 56 is supported in position upon the plate 54 by dowels 57, the plate being held in place by suitable bolts such as 59. The hole locating plate 56, like the fixture plate 17, is disposable, and a different hole locating plate and fixture plate are used for each series of parts to be drilled.

Figure 3:
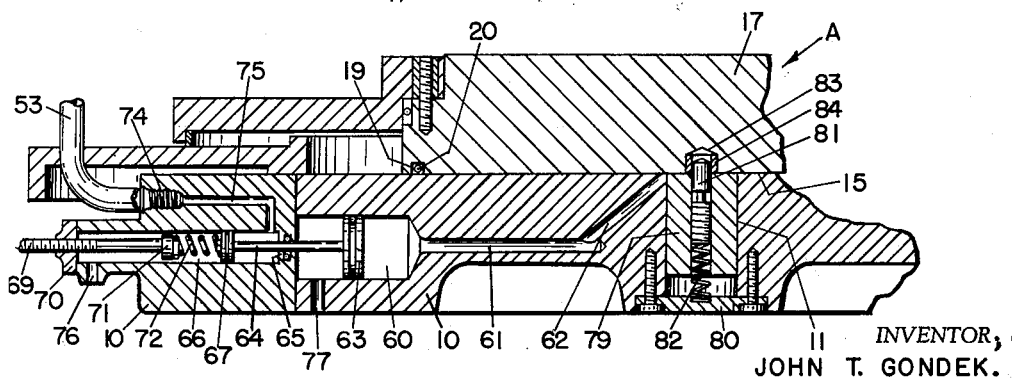
FIGURE 3 is a sectional view through a portion of the table, the position of the section being indicated by the line 3—3 of FIGURE 1, the section being enlarged.

With reference now to FIGURE 3 of the drawings, the base 10 is bored to provide a cylinder 60, one end of which is connected by a passage 61 and a passage extension 62 to the upper surface 15 of the base 10 adjoining the axial aperture 11. The cylinder 60 includes a slidable piston 63 connected to a piston rod 64 extending through a partition wall 65 and into a cylinder 66 which is co-axial with the cylinder 60. A piston 67 is secured to the piston rod 64 within the cylinder 66 and is slidable relative thereto.

A plunger 69 is threaded through the end cap 70 of the cylinder 66 and is provided with a pressure plate 71 at its inner extremity. The spring 72 is interposed between the pressure plate 71 and the piston 67. As indicated in FIGURE 1, a handle 73 is provided upon the plunger 69 by means of which this plunger may be threaded into or out of the cylinder 66.

The conduit 53 is connected to a port 74 communicating with a passage 75 leading to the portion of the cylinder 66 between the piston 67 and the partition wall 65. A vent opening 76 is provided near the opposite end of the cylinder 66. A vent opening 77 is also provided in the portion of the cylinder 60 between the piston 63 and the partition wall 65. This vent opening 77 is shown communicating with the under surface of the base for simplicity of illustration but would normally lead through a side wall of the base so that it would not be blocked when the base 10 were resting upon a flat surface. A piston 79 is slidably supported for vertical movement in the axial bore 11 of the base 10. The lower end of the bore or cylinder 11 is closed by a closure plate 80. A locating pin 81 is supported by the piston 79 for movement therewith. A spring 82 normally urges the locating pin 81 upwardly.

The operation of the apparatus described is substantially as follows:

One of the parts to be drilled with accurately spaced holes is mounted upon the disposable plate 17 in any suitable manner such as by providing positioning blocks on the upper surface of the plate 17 and providing means for holding the part to be drilled against the positioning blocks. The proper location of the holes to be drilled is determined, and the under surface of the plate 17 drilled to provide sockets 83 which are axially aligned with the apertures to be drilled by the drill press. Bushings 84 are pressed into the sockets 83, the bushings being of proper size to accommodate the upper end of the locating pin 81.

The fixture plate 17 is then secured in position to the plate 22. With the pin 81 in retracted position, the plate 17 may be moved until the pin 81 is engaged in one of the bushings 84. A hole is then drilled in the disposable plate 56 of proper size to accommodate the valve plunger 45. This procedure may be followed until for each hole to be drilled in the work piece, there is a corresponding hole in the plate 56. It will be noted that the plate 17 may be moved in any direction upon the base 10 within the limits of movement of the plates 12 and 22.

With the conduit 46 connected to a source of air pressure, the valve plunger 45 is held in raised position during the movement of the fixture plate from one position to another. When the plunger 45 is moved into alignment with one of the holes 89 drilled in the plate 56, the plunger 45 is lowered, permitting air under pressure to flow into the conduit 53. This air under pressure enters the right hand end of the cylinder 66, tending to move the piston 67 to the left as viewed in FIGURE 3, and moving the piston 63 in the cylinder 60 a corresponding distance. The right hand end of the cylinder 60, together with the passage 61 and passage extension 62 filled with hydraulic fluid, and movement of the piston 63 to the left causes a partial vacuum in the passages 61 and 62. This partial vacuum is transmitted to the upper end of the piston 71, assisting the spring 82 in projecting the locating pin 81 into the corresponding bushing 84. This partial vacuum also acts upon the area of the plate 17 inwardly of the sealing ring 20 to hold the plate 17 firmly against the base 10. The hole is then drilled in the part to be drilled.

At the completion of the drilling operation, the valve plunger 45 is lifted, cutting off the source of supply of air through the conduit 53 to the right hand end of the cylinder 66. The spring 72 then applies pressure against the piston 67 tending to urge the piston 63 to the right as viewed in FIGURE 3. This action creates a pressure against the fluid in the cylinder 60, and the passages 61 and 62, this pressure acting to lower or retract the piston 79, withdrawing the locating pin 81 from the bushing 84. This pressure also provides a film of hydraulic fluid between the plate 17 and the base surface 15 inwardly of the sealing ring 20, thus simplifying the movement of the plate upon the base surface. The threaded plunger 69 may be operated to apply just sufficient pressure to the fluid to retract the locating pin and to form the film surface.

The movable portion of the table is then moved by means of the operating arm 84 until the plunger 85 is aligned with another of the openings in the plate 56 whereupon the plunger may again be lowered and the operation may be repeated. This procedure may continue until all of the holes are drilled in their proper locations. At the completion of this operation, the drill parts may be removed from its position on the plate 17 and a new piece may be mounted thereon and may be drilled in the same manner.

In FIGURES 4 and 5 of the drawings, I have disclosed a modified form of construction which does not incorporate the pneumatic control for raising and lowering the locating pin but which otherwise is structurally similar to the table A. The table B indicated in these drawings includes a base 89 which is very similar to the base 10 and includes a central bore 90 which is similar to the bore 11. A piston 91 is slidably supported in the bore 90 and a locating pin 92 is movable with the piston into and out of a bushing 84 in a socket 83 in the under surface of the fixture plate 17. In view of the fact that the fixture plate and virtually all of the remainder of the table is identical to that previously described, the same identifying numerals have been employed.

A peripheral groove 93 is provided in the piston 91 intermediate its ends. A cylindrical aperture 94 extends laterally through the base, the axis of the bore 94 intercepting the axis of the bore 90. A shaft 95 extends through the bore 94 and includes an eccentric pin 96 on its inner extremity. An operating handle 97 is provided on the outer end of the shaft 95 by means of which the shaft may be rotated.

When the handle 97 is in the position illustrated in FIGURE 5, the eccentric pin 96 is near the top of the shaft 95 and the piston 91 and the locating pin 92 are in projected position. By rotating the shaft 95 by means of the handle 97, the pin 96 will be lowered, thus retracting the pin 92 from the bushing 84.

In the preferred form of construction, the base 89 is provided with an oil passage 99 leading to the upper surface 100 of the base 89. A conduit 101 connects the passage 99 to a source of fluid under pressure or partial vacuum. When pressure is applied through the passage 99, a film of oil may be provided between the plate 17 and the base 89. When subject to partial vacuum, the plate 17 is held firmly against the base.

In the construction illustrated in FIGURES 4 and 5, the vertical cylinder which is mounted on the end of the operating arm 41 may slidably support a locating pin 102 which may be manually raised and lowered into or out of engagement with the rough locating holes 89. Thus the structure of the table B is virtually identical with the structure of the table A except for the elimination of the pneumatic control. The means for providing fluid pressure or partial vacuum may be merely a cylinder having a spring urged plunger to provide pressure against the fluid and to provide partial vacuum when the spring is compressed. The same structure would function if the spring were used to supply the partial vacuum and pressure were provided to provide fluid pressure.

In both the constructions described, the fixture plate floats upon the oil when hydraulic pressure is applied. In the first described form, the screw 69 is adjusted to provide sufficient pressure to float the plate 17 without breaking the marginal seal between the fixture plate 17 and the surface 15 of the base. In the second form, the pressure in the pressure line must be adjusted to accomplish the result. In either construction, where the size of the fixture plate is large, spiral or radial grooves may be provided in the under surface thereof to distribute the hydraulic pressure and to permit the plate to be floated.

In accordance with the patent statutes, I have described the principles of construction and operation of my improvement in work positioning tables, and while I have endeavored to set forth the best embodiment thereof, I desire to have it understood that changes may be made within the scope of the following claims without departing from the spirit of my invention.

I claim:

1. A work positioning table including a base, a fixture plate slidably supported on said base and having sockets in the under surface thereof, a locating pin slidably supported for vertical movement in said base, means for sliding said pin from a retracted to a projected position, said pin, when projected being engageable in a socket in said fixture plate, an arm projecting in a generally radial direction from said fixture plate, a member on said base including opposed fulcrums between which said arm extends, a second arm secured projecting from said fixture plate by means of which said fixture plate may be moved, a rough locating plate secured to said base over which said second arm extends, a vertically slidable pin supported by said second arm and movable toward and away from said rough locating plate, said rough locating plate having sockets into which said last named pin may engage when said locating pin is engaged in a corresponding socket in said fixture plate.

2. A work positioning table including a base, a fixture plate slidably supported on said base and having sockets in the under surface thereof, a locating pin slidably supported for vertical movement in said base, means for sliding said pin from a retracted to a projected position, said pin when projected being engageable in a socket in said fixture plate, an arm projecting in a generally radial direction from said fixture plate, a member on said base for pivotally and slidably supporting said arm, a second arm secured projecting from said fixture plate by means of which said fixture plate may be moved, a rough locating plate secured to said base over which said second arm extends, a vertically slidable pin supported by said second arm and movable toward and away from said rough locating plate, said rough locating plate including sockets into which said last named pin may engage when said locating pin is engaged in a corresponding socket in said fixture plate.

3. A work positioning table including a base, a fixture plate slidably supported upon said base and having sockets in its under surface, a locating pin slidably supported for vertical movement in said base and selectively engageable in said sockets, means for moving said locating pin from a projected position in one of said sockets to a retracted position, an arm connected to said fixture plate to extend outwardly therefrom, means on said base for slidably and pivotally supporting said arm, a second arm secured to said fixture plate and projecting outwardly therefrom by means of which said fixture plate may be moved, a pin supported in vertically slidable position in said second arm, and a rough locating plate secured to said base and underlying said second arm, said rough locating plate including sockets into which said last named pin may be inserted, said sockets in the under surface of said fixture plate being aligned with said locating pin when said second pin is engaged in the rough locating plate sockets.

4. The structure of claim 3 and in which said two arms are in diametrically opposed relation.

5. The structure of claim 3 and including means for limiting the movement of said fixture plate on said base.

6. The structure of claim 3 and in which said means for moving said locating pin includes a rotatable shaft extending radially through said base from said locating pin, and an eccentric on said shaft engaging said pin to move the same upon rotation of said shaft.

7. A work positioning table including a base, a fixture plate slidably supported on said base and having sockets in the under surface thereof, a locating pin slidably supported for vertical movement in said base, means for sliding said pin from a retracted to a projected position, said pin when projected being engageable in a socket in said fixture plate, a sealing ring on the under surface of said fixture plate near the periphery thereof, and means for subjecting the area of said fixture plate inwardly of said ring to hydraulic fluid under pressure or partial vacuum.

8. The structure of claim 7 and in which said base includes an axially vertical socket in said base, a piston in said socket and supporting said locating pin, and in which said piston is urged downwardly by hydraulic fluid pressure between said fixture plate and said base, forming the means for moving the locating pin.

9. The structure of claim 8 and including resilient means urging said piston upwardly.

10. A work positioning table including a base having a flat upper surface, a fixture plate slidably supported upon said surface and having sockets in the under surface thereof, a bore in said base having its axis normal to said surface, a piston slidable in said bore, a locating pin supported to extend axially of said piston, movement of said piston in said bore moving said locating pin between a projected position and a retracted position, said pin being engageable in a selected socket in projected position, means urging said pin toward projected position, means for retracting said pin and piston, a sealing ring on the under surface of said fixture plate near the periphery thereof, a hydraulic fluid connection through said base communicating with said surface adjacent said piston, and means connected to said fluid connection for selectively applying pressure or partial vacuum to the fluid in said connection.

11. The structure of claim 10 and in which the means for retracting said pin and piston comprises said hydraulic fluid under pressure.

12. The structure of claim 10 and in which the means connected to the fluid connection comprises a cylinder, a piston within said cylinder, a connection from one end of said cylinder to said fluid connection, and means for moving said last named piston toward or away from said one cylinder end.

13. The structure of claim 10 and in which the means connected to the fluid connection comprises a cylinder, a piston within said cylinder, a connection from one end of said cylinder to said fluid connection, an adjustable spring means designed to urge said piston toward said one cylinder end to apply pressure to said hydraulic fluid, and means for moving said last named piston toward the other end of the cylinder to apply partial vacuum to said hydraulic fluid.

14. The structure of claim 13 and in which said last named means for moving said last named piston comprises a pneumatically operated means.

15. A work positioning table including a base having a horizontal upper surface, a fixture plate having a horizontal under surface slidably supported for movement in any direction on said base and having sockets in the under surface thereof, a locating pin slidably supported for vertical movement in said base, means for sliding said pin from a retracted to a projected position, said pin when projected being engageable in a socket in said fixture plate, a sealing ring on said horizontal under surface of said fixture plate near the periphery thereof and continuously engaged with the horizontal upper surface of said base, and means for subjecting the area of said fixture plate inwardly of said ring to hydraulic fluid under pressure, and means for adjusting said fluid pressure to float said fixture plate on said base.

References Cited in the file of this patent
UNITED STATES PATENTS

| | | |
|---|---|---|
| 2,807,180 | Adams | Sept. 24, 1957 |
| 2,829,566 | Gecks et al. | Apr. 8, 1958 |
| 2,874,599 | Charlat | Feb. 24, 1959 |
| 2,885,915 | Schurger | May 12, 1959 |